United States Patent
Oltman et al.

(10) Patent No.: US 8,781,797 B1
(45) Date of Patent: Jul. 15, 2014

(54) VIRTUAL DRIVE TEST TOOL

(75) Inventors: Randy L. Oltman, Tinton Falls, NJ (US); Steven R. Rumsby, Colts Neck, NJ (US); Paul Anthony Collins, Lakewood, NJ (US); Ahmed A. Turk, Lakewood, NJ (US); Michael D. Bailey, Fort Worth, TX (US); Joshua Barry Morman, Howell, NJ (US); Peng Gao, East Brunswick, NJ (US); Wai Kwok Law, San Jose, CA (US)

(73) Assignee: Spirent Communications, Inc., Sunnyvale, CA (US)

( * ) Notice: Subject to any disclaimer, the term of this patent is extended or adjusted under 35 U.S.C. 154(b) by 803 days.

(21) Appl. No.: 12/850,986

(22) Filed: Aug. 5, 2010

Related U.S. Application Data (60) Provisional application No. 61/231,652, filed on Aug. 5, 2009, provisional application No. 61/231,540, filed on Aug. 5, 2009.

(51) Int. Cl.
*G06F 17/50* (2006.01)

(52) U.S. Cl.
USPC ............. 703/2; 703/5; 703/9; 455/67.11; 455/67.14; 455/115.1

(58) Field of Classification Search
USPC ............. 703/2, 5, 9; 455/67.11, 67.14, 115.1
See application file for complete search history.

(56) References Cited

U.S. PATENT DOCUMENTS

| | | | |
|---|---|---|---|
| 6,208,841 B1 | 3/2001 | Wallace et al. | |
| 7,324,588 B2 | 1/2008 | Green et al. | |
| 7,349,670 B2 | 3/2008 | Mlinarsky et al. | |
| 7,508,868 B2 | 3/2009 | Chang | |
| 8,364,090 B2 * | 1/2013 | Ramasamy et al. | 455/67.14 |
| 2006/0229019 A1 | 10/2006 | Mlinarsky | |
| 2006/0239198 A1 | 10/2006 | Mlinarsky et al. | |
| 2006/0264178 A1 * | 11/2006 | Noble et al. | 455/67.11 |
| 2007/0019769 A1 | 1/2007 | Green et al. | |
| 2009/0047925 A1 * | 2/2009 | Rahman | 455/404.2 |
| 2011/0230143 A1 * | 9/2011 | Lundstrom et al. | 455/67.11 |
| 2011/0263215 A1 * | 10/2011 | Asplund et al. | 455/115.1 |

\* cited by examiner

*Primary Examiner* — Thai Phan
(74) *Attorney, Agent, or Firm* — Kenta Suzue; Haynes Beffel & Wolfeld LLP (57) ABSTRACT

A channel emulator reads a record of captured radio signal data of a group of cellular base stations in a fielded cellular network from a memory. Based on the record of the captured radio signal data, the channel emulator generates a simulation of a radio environment of the fielded cellular network. In one aspect, the simulation generates a number of live cellular base station signals fewer than the group of cellular base stations in the fielded cellular network. In another aspect, a terrain environment model is applied based on the captured radio signal data.

29 Claims, 9 Drawing Sheets

VIRTUAL DRIVE TEST TOOL

REFERENCE TO RELATED APPLICATION

This application claims the benefit of U.S. Provisional Patent Application No. 61/231,652 filed 5 Aug. 2009, and claims the benefit of U.S. Provisional Patent Application No. 61/231,540 filed 5 Aug. 2009, all of which are incorporated herein by reference.

RELATED APPLICATION

This application is related to "Open RF Test Pack" Ser. No. 12/851,448 filed 5 Aug. 2010, incorporated herein by reference.

BACKGROUND

1. Field of the Invention

The present invention relates to systems, methods, and computer readable media for wireless device testing.

2. Description of Related Art

Wireless network operators and device manufacturers typically perform field drive testing to evaluate device performance and prove capabilities.

However, field drive testing is complex and the testing environment is not well controlled. As a result, troubleshooting of events which occur during drive testing scenarios typically requires extensive repetition of the field drive tests. This kind of testing is time consuming and expensive, making it difficult to do more than the most basic functional testing over a limited set of configurations and underlying conditions.

Additionally, since different wireless devices may respond quite differently to the same RF scenarios, the field drive tests are typically repeated for each of the different devices.

In or around the year 2000, Spirent Communications, Inc. provided Qualcomm Inc. with technology that tested mobile handsets based on previously gathered field RF measurements. Also in or around the year 2000, Kyocera Wireless Corp. bought Qualcomm Inc.'s terrestrial Code Division Multiple Access (CDMA) wireless handset business. It is believed that the technology described in U.S. Pat. No. 7,508,868 assigned to Kyocera Wireless Corp., is derived from the technology provided by Spirent Communications, Inc. to Qualcomm Inc., and that this technology provided by Spirent Communications, Inc. to Qualcomm Inc. is cumulative to the contents of U.S. Pat. No. 7,508,868 assigned to Kyocera Wireless Corp. U.S. Pat. No. 7,508,868 is incorporated herein by reference.

U.S. Pat. No. 7,508,868 describes a technology which is limited in that, a maximum of 6 emulated base station signals are generated by 6 emulated base stations to correspond to a maximum of 6 CDMA channels recorded at any point on a city street, such a base station emulator generates one emulated base station signal for each recorded channel. One would not modify the technology described in U.S. Pat. No. 7,508,868 to emulate a larger number of recorded channels with a smaller number of emulated channels, because the need simply does not arise, according to U.S. Pat. No. 7,508,868.

It is therefore desirable to provide methods and systems for testing wireless devices addressing the various issues discussed above.

SUMMARY

Methods and systems are described herein for capturing RF channel conditions in the field, and using the captured RF channel conditions to test wireless devices in a dynamic controlled lab test environment. As described herein, the system consists of software applications and hardware coupled in a unique way to allow playback of captured field data in the laboratory environment. As a result, the performance of the wireless device can efficiently be measured in a reliable and repeatable manner.

The dynamic lab test environment emulation described herein can elicit responses and behaviors in wireless devices matching real-world performance observed during field drive testing. Using a laboratory playback method as described herein allows for repeatable playback of field scenarios useful for debug and verification, and thus can dramatically reduce the field drive testing time and its associated uncertainties and expenses. Furthermore, devices and technologies that cannot be brought into the field (for example, because of form factor or corporate policies), can be tested in the lab under realistic conditions that were captured in the field.

The dynamic lab test environment emulation using captured RF channel conditions as described herein enables reliable benchmarking of wireless devices in a repeatable manner under real-world conditions.

Additionally, RF channel conditions based on the field measurements can be manipulated and changed over time in the lab to test theories, and to create even more hostile RF scenarios.

Other aspects and advantages of the present invention can be seen on review of the drawings and the detailed description which follow.

DETAILED DESCRIPTION

Figure 1:
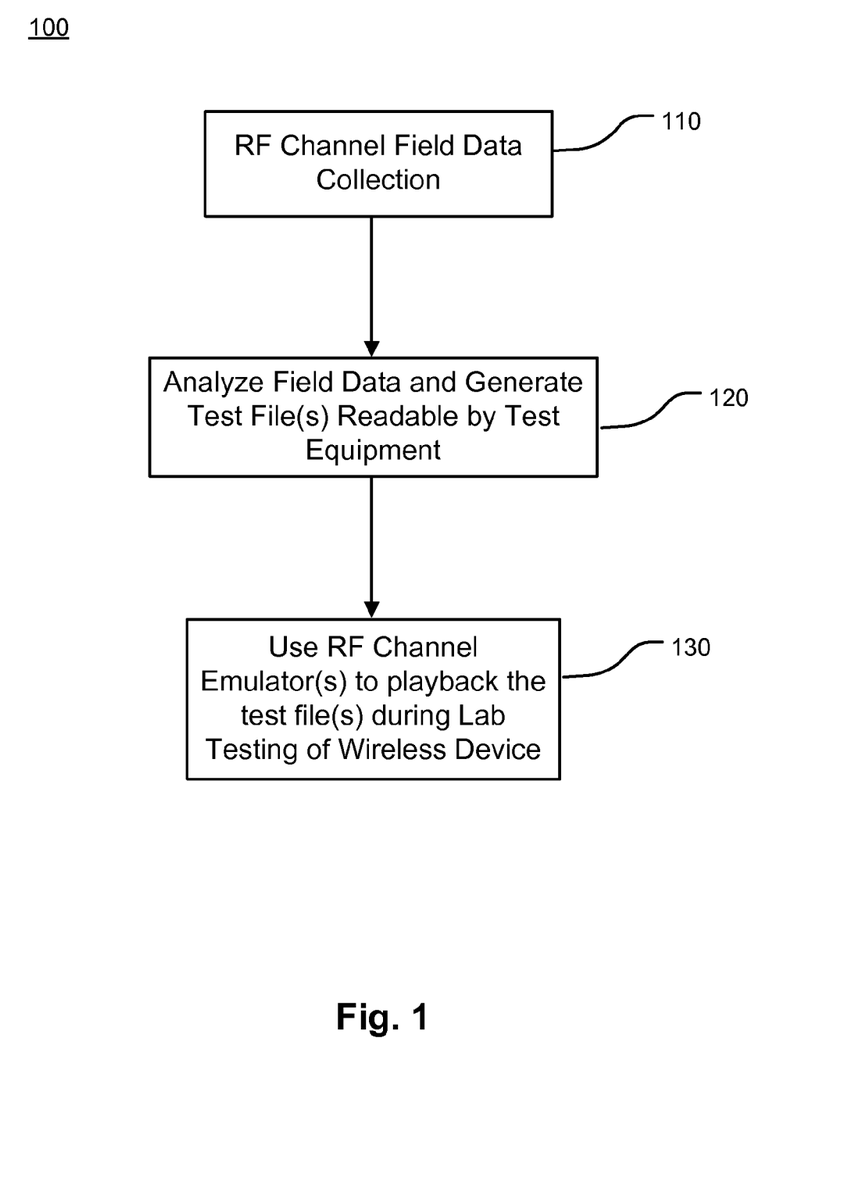
FIG. 1 is a flow diagram of a process for capturing RF channel conditions in the field, and using the captured RF channel conditions to test wireless devices in a controlled lab test environment.

FIG. 1 is a flow diagram of an embodiment of a process 100 for capturing RF channel conditions in the field, and using the captured RF channel conditions to test wireless devices in a controlled lab test environment.

At block 110 field drive testing is performed using a scanner receiver and logging software to collect and record RF channel data as a function of time. In the illustrated example, the recorded RF channel data includes received power, power of subchannels, GPS position as well as full NMEA data, and multipath information for the RF environment.

The collection and recording of block 110 can be performed, for example, using a JDSU scanning receiver. Alternatively, other scanners and logging software can be used.

Next, at block 120 the collected field data is analyzed, and the analyzed data is used to generate test file(s) readable by test equipment for subsequent use in lab testing of wireless devices. This is described in more detail with reference to FIG. 2 below.

Figure 2:
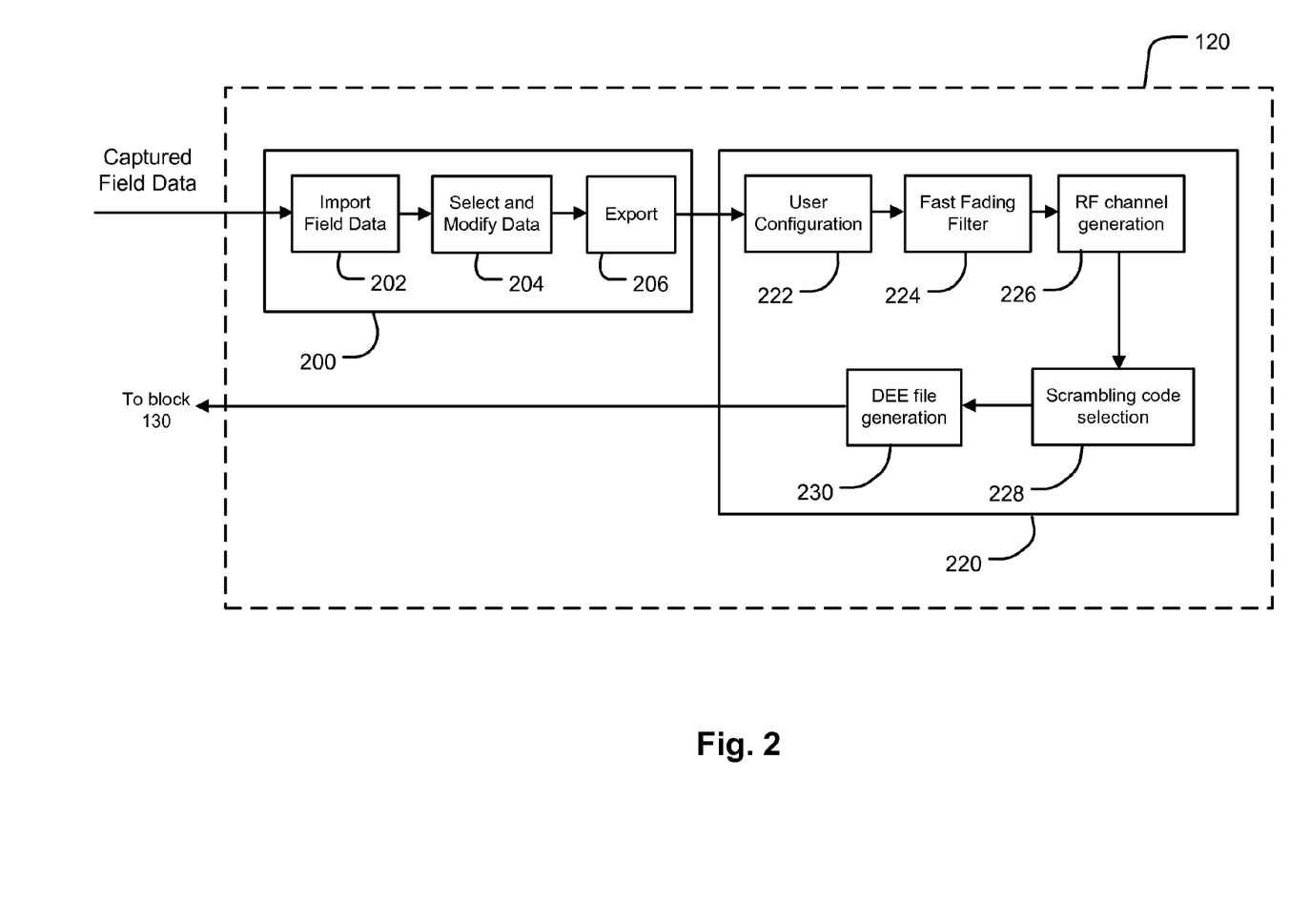
FIG. 2 is a flow diagram of the analysis of the collected field data and the generation of the test file(s) for playback in a controlled lab test environment.

FIG. 2 illustrates a flow diagram of an embodiment of block 120 of the analysis of the collected field data and the generation of the test file(s).

At block 200 the collected field data is analyzed and portions of the collected data is selected for use in generating the subsequent test file(s) for emulation in the lab.

At block 202 the data captured in the field is imported into a software processing tool which encapsulates processing and mapping functions described herein. Next, at block 204 the user can select and/or modify the imported data to select the data to be used in generating the test file(s). Next, at block 206 the data is exported for use in generating the test file(s).

At block 220 the data exported from the data analysis of block 200 is used to generate the Dynamic Environment Emulation (DEE) test file(s) used to configure one or more channel emulators during testing of a wireless device. At block 220, the terrain environment model is also selected. The selection can be user driven and/or rely on interpretation of the captured data. In the illustrated embodiment the DEE test file(s) are files used to configure one or more Spirent SR5500 Wireless Channel Emulators manufactured by Spirent Communications of Eatontown, N.J.

As described below, the DEE test file(s) incorporate the collected field data to provide dynamic control over time of the emulated RF channels during testing of wireless devices in the lab. Other types of test files may alternatively be used, depending upon the properties of the test equipment used.

Parameters of the RF channels that can be stored for playback and thus can be changed in the channel emulator at specified time intervals during testing include state duration, channel power level, whether or not AWGN is enabled, signal-to-noise ratio, the on/off status of multipath components, the power delay profile delays which affect delay spread, angle of signal arrival, vehicle speed and Doppler velocity, channel phase shifts, and all aspects of MIMO channel correlation settings. These parameters can be utilized to dynamically recreate all aspects of the cellular propagation environment. Additional parameters may also be used. Examples of a cellular environment are GSM, WCDMA, LTE, WiMAX, and CDMA. A cellular environment smoothly hands off a data or voice call between cellular base stations. In contrast, a WLAN connection simply ends when a WLAN access point becomes out of range, such that a smooth hand off does not occur. From a system view, a cellular environment relies on channel reuse throughout a cellular coverage region, by limiting a particular same set of channels within certain geographic areas—cells—that are separated sufficiently to limit interference. Neighboring cells are positioned closely enough to provide adequate coverage and smooth handoff between neighboring cells.

At block 222 of FIG. 2 the user configures parameters that will be used in the next stages. The configuration of parameters includes, for example, setting of averaging windows, selection of mapping algorithm, and other controlling parameters for the data conversion.

If the scanning of the RF environment is fast enough, block 224 (fast fading filter) is not required. A fast enough sample rate can be described as one that is fast enough to accurately capture the fast fading effects of the signals rapid amplitude and phase variation. In an RF multipath environment, it has been observed that fading typically occurs approximately every one wavelength, where wavelength is the speed of light (c) divided by the RF frequency (f). For example, with a 2 GHZ RF signal, one wavelength is 15 centimeters. If a vehicle is driving at 100 km/hr (27.8 meters/sec), it would encounter approximately 185 fades per second for this 2 GHz signal. A scanner scanning at a minimum of 2-4 times this fading rate may properly capture and represent the fast fading effects. Thus, the minimum scanner sampling rate for capturing accurate fast fading effects is a function of RF frequency and the vehicle velocity. While it is highly desirable to record the fast fading effects directly, it has been found that scanners typically cannot accurately record fast fading effects on signals amplitude and phase, thereby creating distortion in the scanned field data. In such a case, the measured scanner data can be averaged to remove the interaction of the fast fading with the relatively low sampling rate of the scanner.

At block 224 filtering of fast fading effects of the data recorded by the scanner is optionally performed. To filter out the distortion introduced by fast fading, at block 224 the user configures the averaging window size as a function of the signals wavelength and velocity reported by the GPS data. If the scanner samples fast enough, an accurate estimate of fast fading effects can be gathered and used directly without the use of filtering of block 224.

Next, at block 226 RF channel parameters including cell power and noise power for all the scanned cells of the selected scanned data are generated. The RF channel generation consists of using the filtered RF channel data to create average channel power levels which are representative of the rms measured channel power from the field data. Further, noise or additional data for emulated cells are added to emulate residual cell energy captured by the scanner but not explicitly identified as a base station by the scanning receiver.

Next, at block 228 the scrambling codes of the scanned cells corresponding to capture data are mapped to the available RF test channels used to emulate the captured RF channel conditions during testing of wireless devices in the lab.

A variety of different techniques can be used for the mapping of block 228. Multiple examples of mapping techniques are discussed in more detail below with reference to FIGS. 3-6.

Figure 3:
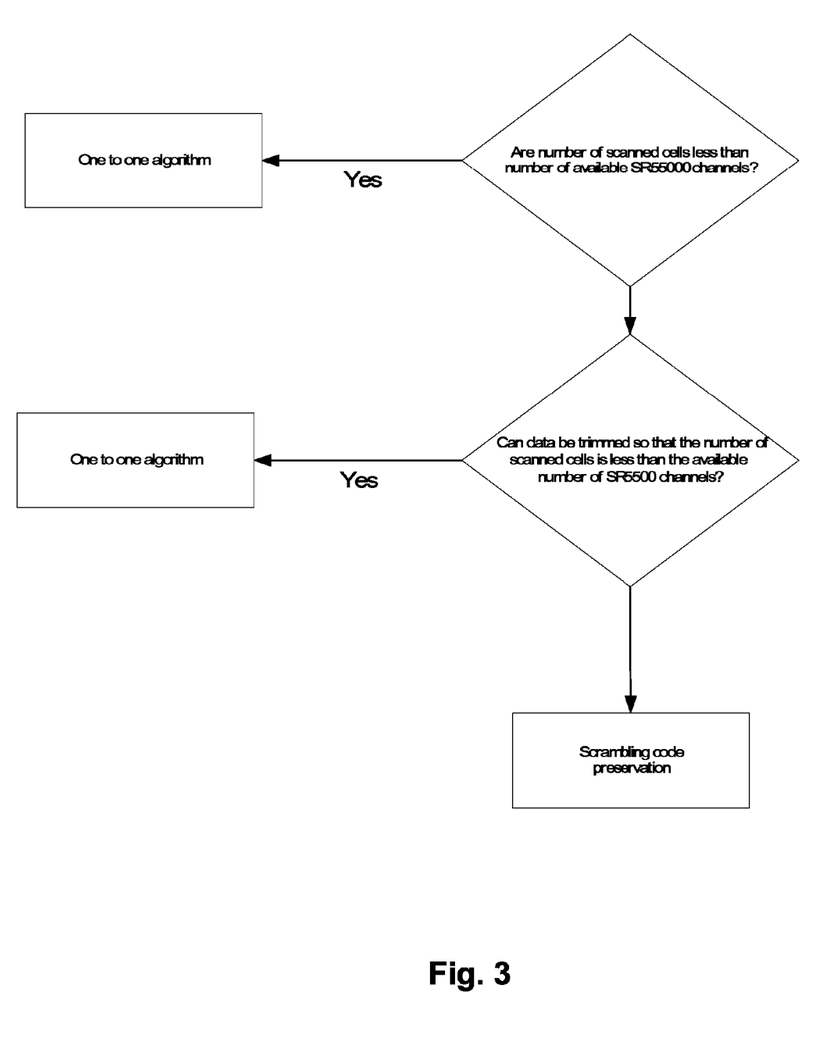
FIG. 3 is a flow diagram that selects a scrambling code algorithm that maps scanned base stations from a fielded network, to live cellular base station signals in simulation.

FIG. 3 is one embodiment of a flow diagram usable to select a scrambling code algorithm among examples discussed below, depending on the number of scanned cells and the available test channels.

As shown in FIG. 3, if the number of scanned cells is less than or equal to the number of available RF test channels, or if the data can be trimmed so that the number of scanned cells is less than or equal to the number of available RF test channels, the one-to-one algorithm can be used. Examples of situations in which the data may be trimmed include very short drive tests or capture intervals, and drive tests where the region driven is small such that the observed unique base station count low.

When the number of scanned scrambling codes is more than the number of available RF channels in the lab, an intelligent algorithm is used to select the proper cells to provide an approximation of the environment, so that the behavior of the DUT in the lab closely matches the performance in the real world. Creating these algorithms requires an understanding of how phones scan for base stations and makes decisions about cell selection, reselection, etc. One example of such an intelligent algorithm is the scrambling code preservation algorithm discussed below.

The one-to-one algorithm can provide the closest approximation to the captured field data when a sufficient number of NodeBs and channel emulators (e.g. SR5500s) are available to emulate all of the scanned cells.

In this example, the algorithm starts at the beginning of the selected drive test data and records the initial power for each scrambling code in the selected logged data. Over time the algorithm sorts the scrambling codes in descending order and assigns available RF test channels a scrambling code in order, starting with the scrambling code of the cell with the strongest initial power. Over time if the number of scanned cells in the logged data is greater than the number of available RF test channels, once all of the available RF test channels have been assigned a scrambling code, the remaining cells are not mapped.

Figure 4:
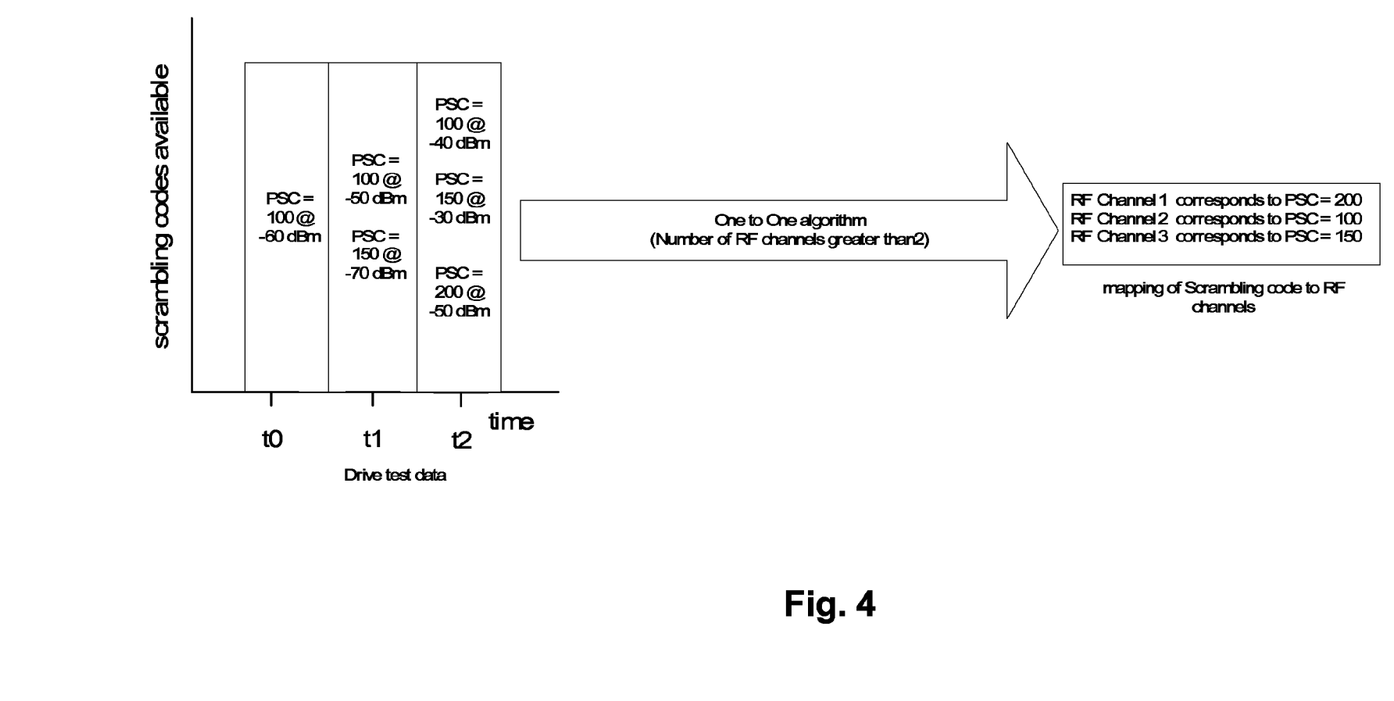
FIG. 4 is a diagram showing a one-to-one mapping of scanned base stations from a fielded network, to live cellular base station signals in simulation

The one-to-one algorithm may be preferred if the number of RF test channels available is greater than or equal to the number of scrambling codes captured in the selected drive test data, because in such a case each cell will have a dedicated RF channel modeling the cell during the entire DEE emulation (discussed below). FIG. 4 shows an example of the one-to-one mapping algorithm when the number of available RF test channels is greater than or equal to the number of scanned scrambling codes.

Figure 5:
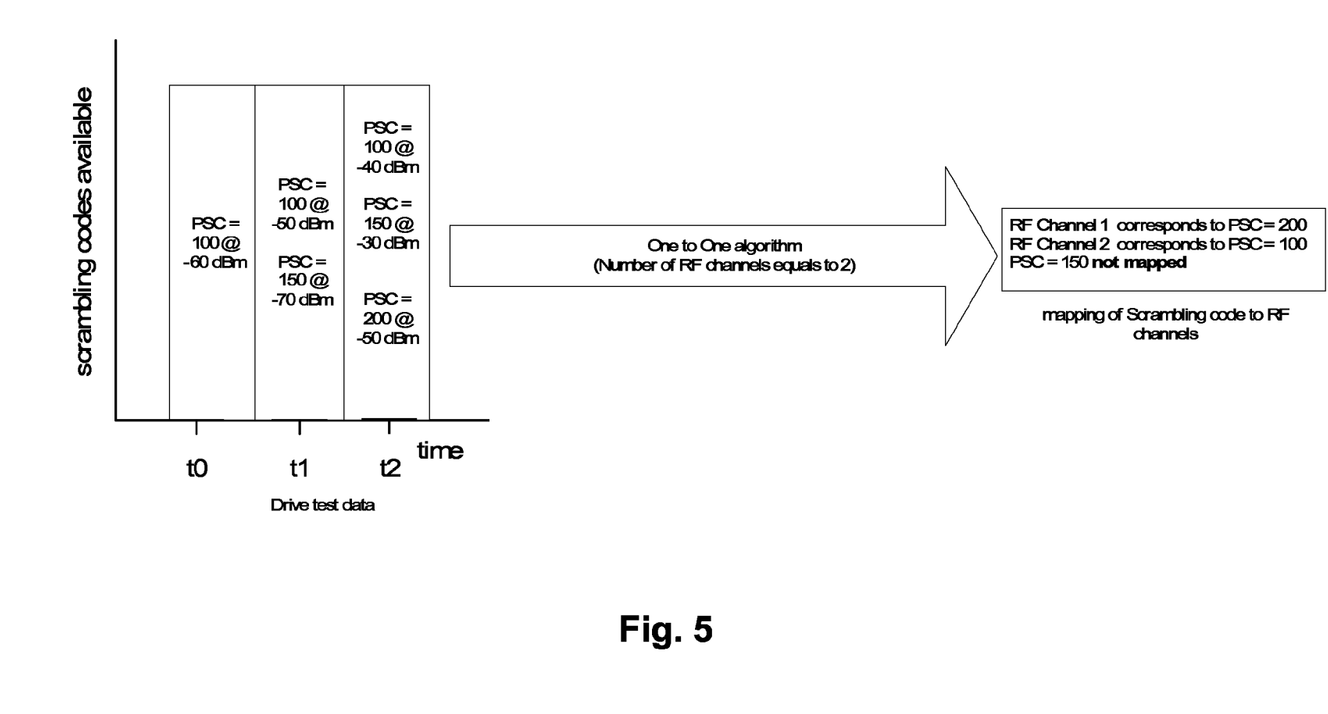
FIG. 5 is a diagram showing a selective mapping of a larger number of scanned base stations from a fielded network, to a fewer number of live cellular base station signals in simulation

As described in the example above, when the number of scanned scrambling codes is more than the number of available RF channels, the one-to-one algorithm does not process data for the scrambling codes that appear once all the available RF test channels have been assigned. For the same scanned data as shown in FIG. 4, FIG. 5 shows an example where only 2 RF test channels available, resulting in one cell (PSC=150) that is not mapped to any of the RF test channels.

If the number of captured Primary Scrambling Codes which are desired to be emulated exceed the number of available RF channels, the scrambling code preservation algorithm described below may be preferred in some embodiments.

The scrambling code preservation algorithm example discussed herein is designed to map the strongest PSCs in each DEE state to the available RF test channels, and preserve the mapping between PSC and RF channel number.

If the number of available RF channels is "N", the algorithm in each DEE state is to map the "N" scrambling codes with the strongest Ec/Io to the N RF channels. At each DEE state, if a particular un-mapped scrambling code has a greater CPICH power than the weakest mapped scrambling code, the weakest scrambling code mapped to an RF channel will be replaced with the particular un-mapped scrambling code. In the illustrated embodiment, a maximum of one scrambling code switch occurs at each DEE state. More generally, one or more scrambling code switches can occurs at each DEE state in embodiments.

Figure 6:
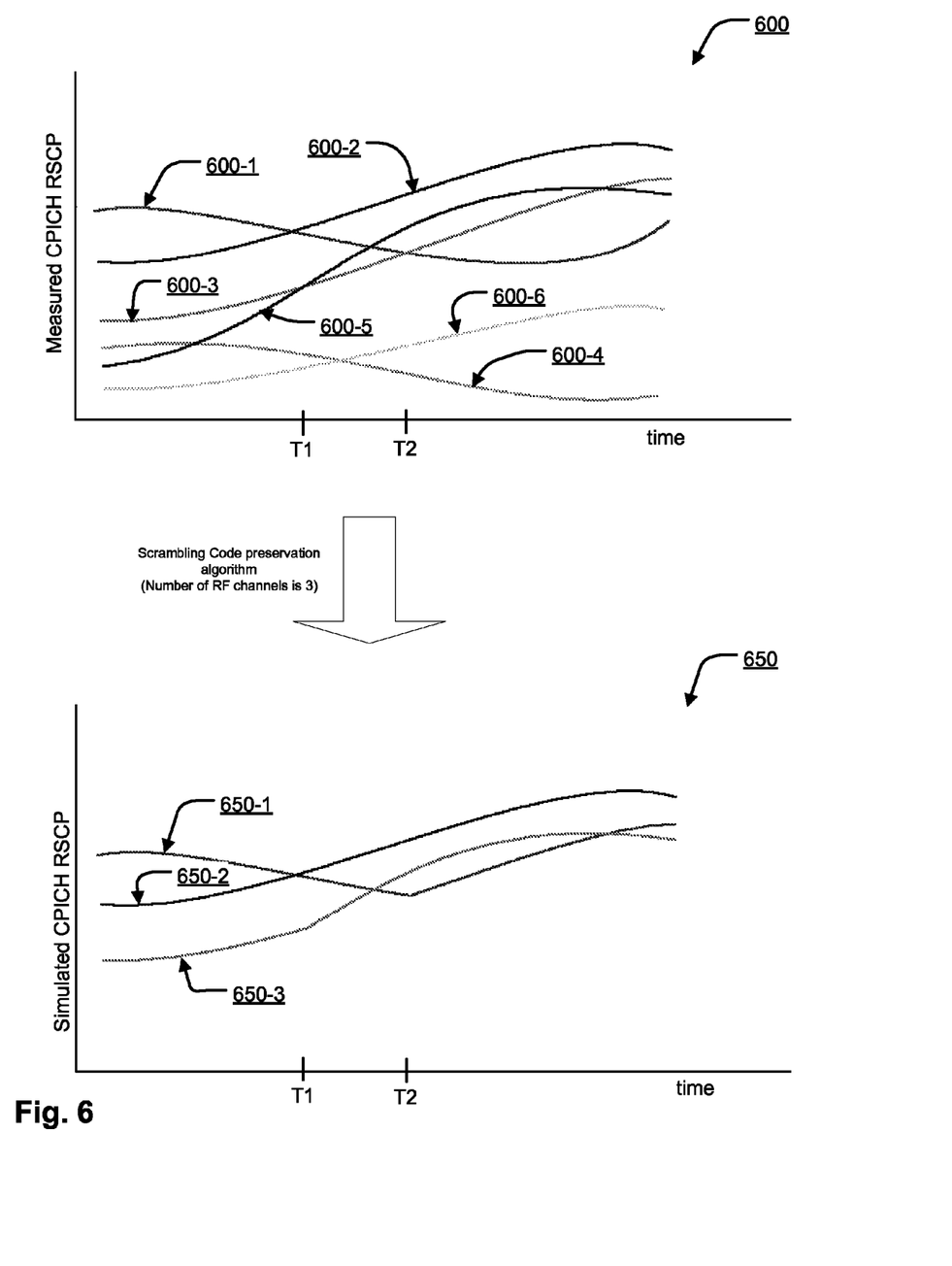
FIG. 6 is a graph of scrambling power versus time.

An example of a scrambling code preservation algorithm is shown in FIG. 6. In FIG. 6, the scanned data 600 has data for 6 different scrambling codes (600-1 to 600-6), and in this example only 3 RF test channels (650-1 to 650-3) are available for the emulated data 650.

As shown in FIG. 6, initially the algorithm assigns the three strongest cells 600-1, 600-2, 600-3 of the scanned data 600 to the three channels 650-1, 650-2, and 650-3 respectively.

At time $T_1$, the cell power of un-mapped scrambling code 600-5 becomes greater than that of mapped cell 600-3, and the algorithm assigns scrambling code 600-5 to the channel 650-3 that presently has the weakest RF power.

At time $T_2$, the cell power of un-mapped scrambling code 600-3 becomes greater than the mapped cell 600-1, and the algorithm assigns scrambling code 600-3 to the channel that presently has the weakest RF power, channel 650-1.

Thus, the scrambling code preservation algorithm provides an approximation when the number of RF channels available in the lab is less than the number of scanned cells.

Referring back to FIG. 2, at block 230 the DEE test file(s) are generated for the available RF test channels. Since the SR5500 has two output channels, in the illustrated embodiment a DEE file will be produced for each pair of channels, which will be played back synchronously on the SR5500s.

Referring back to FIG. 1, at block 130 the generated DEE test files are played back using RF Channel Emulators during lab testing of wireless devices.

The DEE file, when played back in this system, accurately reproduces the RF channel conditions as measured by the scanning device. For WCDMA channels, this can include accurately reproducing RSSI, a/Io, and RSCP, and for GSM channels this includes accurately reproducing RSSI and C/I ratio. Parameters that can be stored in the DEE file, and thus can be changed in the channel emulators at specified time intervals during testing, include state duration, channel output power, AWGN Status (On/Off), C/N ratio, Path Status (On/Off), Path Delay, Relative Path Loss, Rician Line of Sight Angle of Arrival, Rician K Factor, Frequency Shift, Doppler Velocity, MIMO Sub-Channel Status (On/Off), MIMO Sub-Channel Relative Power, and MIMO Sub-Channel Phase, and Correlation Matrix between MIMO subchannels. The conversion process also considers the reality of mapping a larger number of cells seen in the drive test to the number of channels available in the lab-based system. This file could also be created by the user to represent a known or hypothetical RF scenario.

The following is another description of mapping algorithms between captured base stations and an available channel for simulation.

Maximum Power Mapping Algorithm

1. Given N as the number of available channels for the purpose of simulating the wireless network and BIN is a portion or segment of the captured data and WINDOW is a portion of captured data around the BIN.

2. For each BIN in the captured data, the power of each captured base station in the captured data is averaged over the WINDOW.

3. Each BIN in the captured data has an associated list of powers for all the captured base stations. This list of powers when sorted from strongest to weakest is referred to as the 'Top N List' where N has previously been defined.

4. Initially, the top N channels in the total power list of the first bin are "mapped" to the N available channels at the first BIN.

5. For the next BIN, the top N channels will be compared against the top N channels of the current BIN using the following rules.

a. For each of the captured base stations that exist in both the current and next top N list, the captured data from those base stations will stay mapped for simulation purposes during the next BIN.

b. For the captured base stations which are not the same between the current and the next BIN in the Top N list, the base stations in the current BIN will be compared against the base stations in the next BIN with reference to their total power. If the difference in total power of the captured base station is less than a defined value, such as but not limited to 3 dB, the base station that is mapped for simulation will stay mapped in the next BIN. Otherwise, the strongest captured base station which is currently unmapped for simulation will be mapped for simulation. Base stations are selected from the current and the next BIN in such a way to maximize the number of base stations with preserves mapping from the current BIN to the next BIN.

6. Step 3 is repeated until all the BINS in the captured data are processed.

Preservation Algorithm

1. Given N as the number of available laboratory channels for the purpose of simulating the wireless network; BIN is a portion or segment of the captured data, WINDOW is a period of time from the current BIN and Y is a programmable value indicating the number of captured base stations to evaluate for the purpose of re-mapping.

2. For each BIN in the captured data, the captured base stations are sorted from strongest to weakest.

3. Initially, the top N strongest channels in the first bin are mapped for simulation to the N available simulation channels.

4. For the next BIN, each of the available channels are processed with the following rules:
   a. If the base station currently mapped for simulation is present in the Top Y strongest channels captured for the specified WINDOW period, it will remain mapped for simulation. Otherwise the channel assigned for simulating this base station will be released.
   b. If the current base stationreleased, the next strongest unmapped captured base station will be mapped to a channel for simulation.
   c. If there are no unmapped channels, the channel will be muted and no signal will be simulated.

5. Step 4 is repeated until all the BINS in the captured data are processed.

The following discussion is about mapping algorithms generally. In the real world the wireless device is detecting different base stations. Each of these cells is at a different location around the wireless device. Since these cells are at different distances from the wireless device when the wireless device switches between the cells, the signals will have different delay and frequency characteristics.

When a mapping algorithm determines that a new channel should be mapped, the RF conditions for the new channel are modified to simulate the transition event. The modifications to the RF channel may include, but not be limited to one or more of: time offset, frequency offset, change in Doppler velocity, and delay offset.

By using a scanner/UE combination, specific troublesome network scenarios can be captured with UE events aligned to RF measurements. Whereas traditional drive testing would require additional drive testing, the Virtual Drive Test System described herein allows for the original drive test to be reliably reproduced as often as required for debug and verification. By converting the original log files into DEE compatible playback files, the same RF scenario which caused the UE problem in the field can easily and accurately be replicated in the lab.

Figure 7:
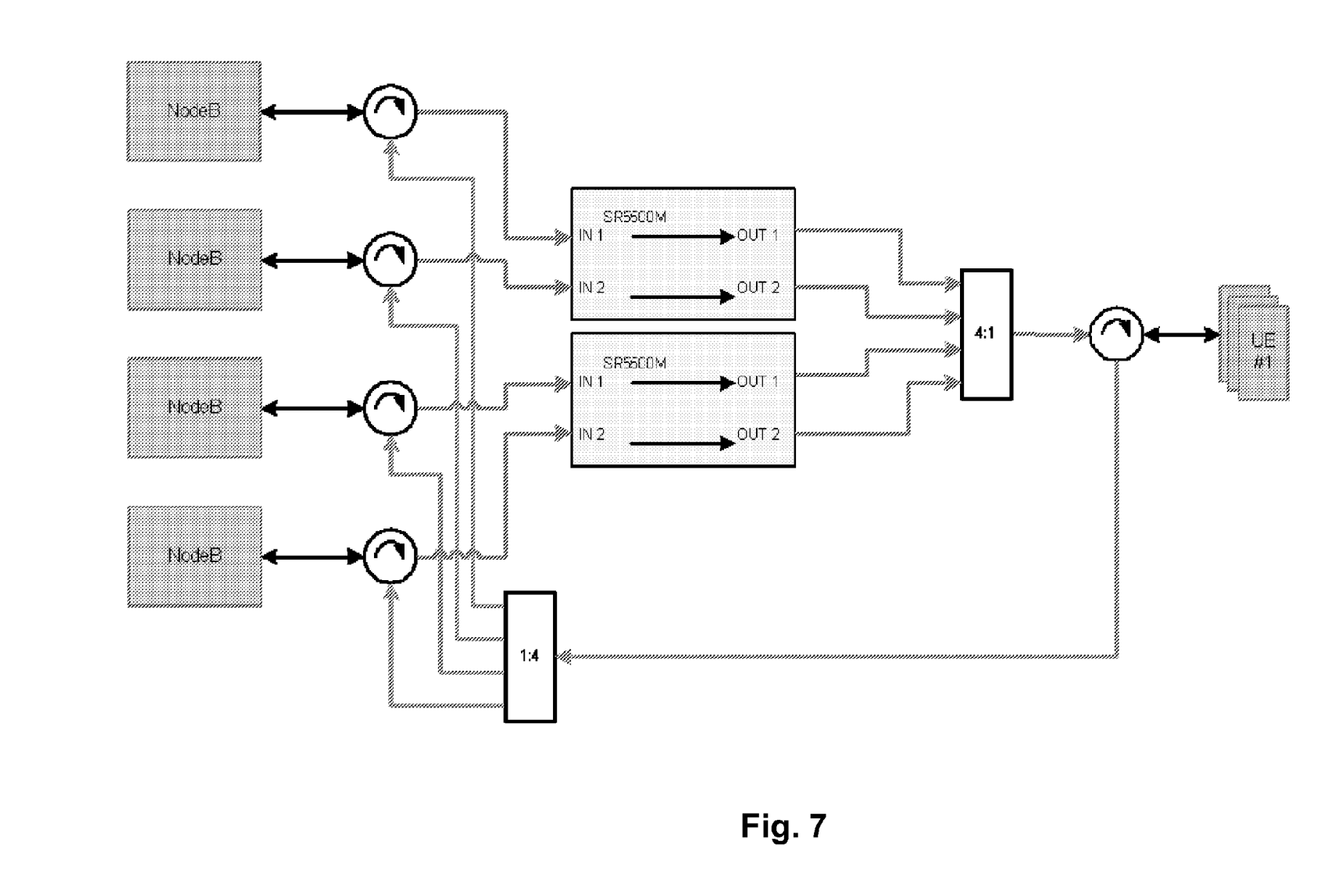
FIG. 7 is another graph of scrambling power versus time.

FIG. 7 is a simplified block diagram of a lab based system 700 used to emulate 4 cells of a drive test. During testing of the UE, the DEE emulation files are loaded and played back over time while the UE is connected to the NodeBs. As a result, a very similar and repeatable RF scenario produces repeatable behavior on the UE which can aid in debugging and root cause analysis.

Since different UEs may respond quite differently to the same RF scenarios, the repeatable nature of the lab based system makes benchmarking of UEs under real-world conditions possible.

Because the RF environment in the lab is emulated based on the field measurements, the RF conditions can also be manipulated and changed over time to test theories, or create even more hostile RF scenarios.

When trying to simulate the real world, just using captured data is incomplete, because there are many subtle effects that are not captured. These effects can be estimated and simulated with information about the area around the wireless device, when the RF data was captured.

These effects can include any of, and are not limited to:

1. How the multipath conditions change between captured measurements. A capture device will take snapshots of the RF conditions, but what actually happens between these snapshots is not captured.
2. If there is a Line Of Sight (LOS) component to the wireless signal. The captured RF conditions alone do not indicate whether there is a LOS between the wireless antenna of the capturing device and the cellular wireless network. This LOS component may also appear and disappear as the wireless device moves.

To address such deficiencies, data such as GPS & cellular network measurements are used to estimate the terrain environment around the capturing wireless device for the purpose of simulating real world wireless channel conditions.

Figure 9:
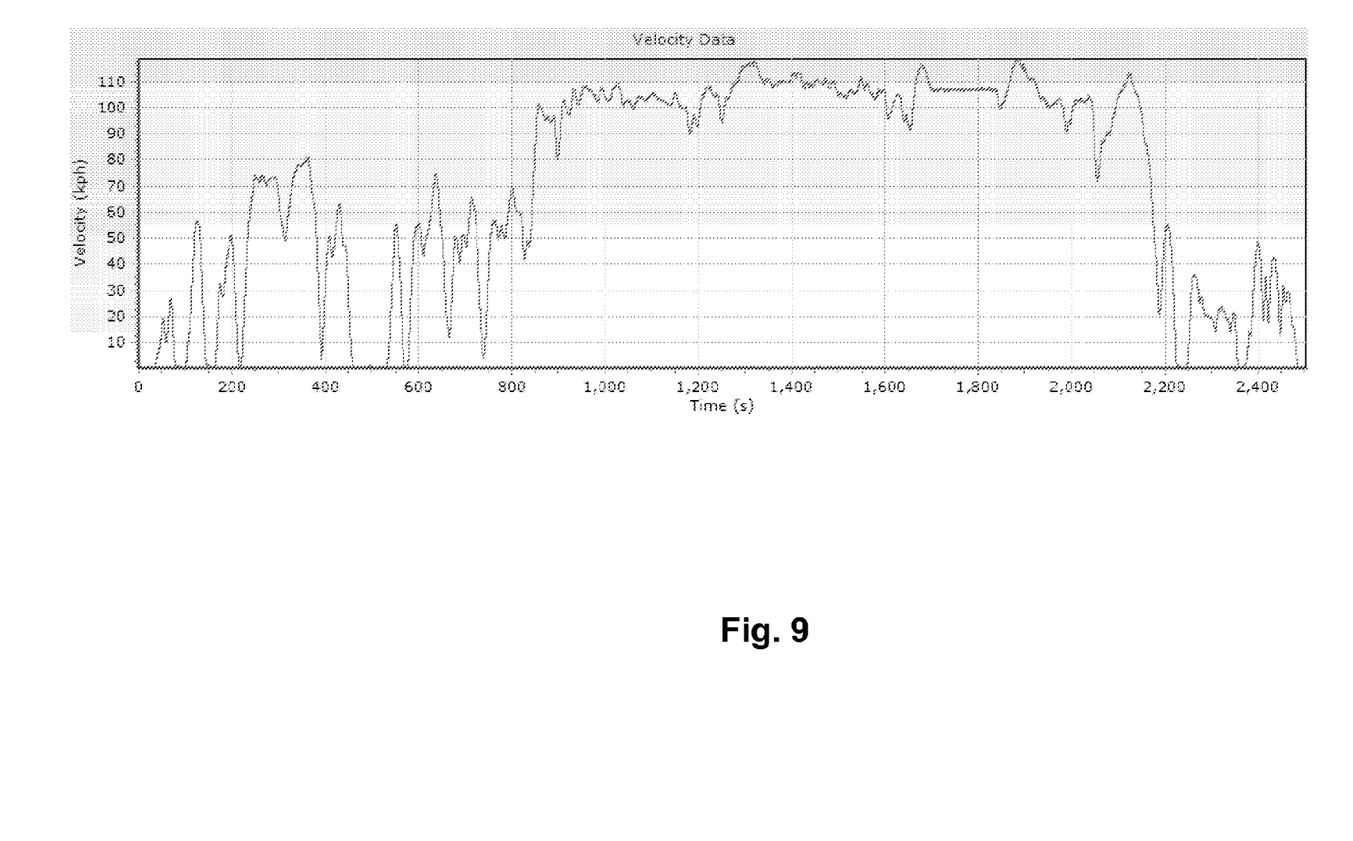
FIG. 9 is a plot of captured velocity information to determine a terrain environment model.

This estimation could be performed by any of, and are not limited to:

1. Use of geodetic information about the surrounding area and then use of the captured GPS location to reference the area around the wireless device to estimate the terrain environment.
2. Use of the captured velocity information of the wireless device to estimate terrain environment. From plot information show in FIG. 9, a stop-go pattern of a device is seen between Os to 800 seconds, so this area could be classified as an urban terrain environment. The time from 820 seconds to 2100 seconds could then be classified as a highway terrain environment.
3. Use of detected cell IDs and distance traveled to estimate density of cells within the cellular network. To provide high capacity in the wireless cellular network the area covered by a single wireless cell decrease with respect to population density. An example of this is in Manhattan where a single cell in a wireless cellular network may only cover a few blocks. In a suburban area a single cell may be configured to cover up to mile and in a rural environment the cell may be configured to cover several miles. Note: The distances are just examples of possible network configurations and are not meant to be precise. Using the distance traveled and how long the cell is detected can be used to determine the size and density of cell coverage. This information can then be used to estimate the environment.
4. Any combination of techniques can be applied to improve or enhance the estimation process.

Some embodiments perform dynamic modeling. In static modeling, the operator of the wireless channel emulator equipment defines or picks from a standard wireless channel model (e.g., Dense Urban, Suburban, Hilly Terrain) to be used in conjunction with the captured wireless channel data to compensate for the lack of environment data for the entire period of the simulation. In one type of dynamic modeling, terrain environment estimation is used to automatically select the appropriate wireless channel model. In another type of dynamic modeling, multiple terrain environment models are allowed within a single simulation. In yet another type of dynamic modeling, wireless channel models are automatically switched based on changes in the estimated terrain environment model. The wireless channel model can contain any of, but is not limited to: number of multipath, relative path loss between multipath, relative delay between multipath, fading type of each multipath (Rayleigh, Rician, etc.), Doppler velocity of each multipath, and LOS and Angle of Arrival (AOA).

Figure 8:
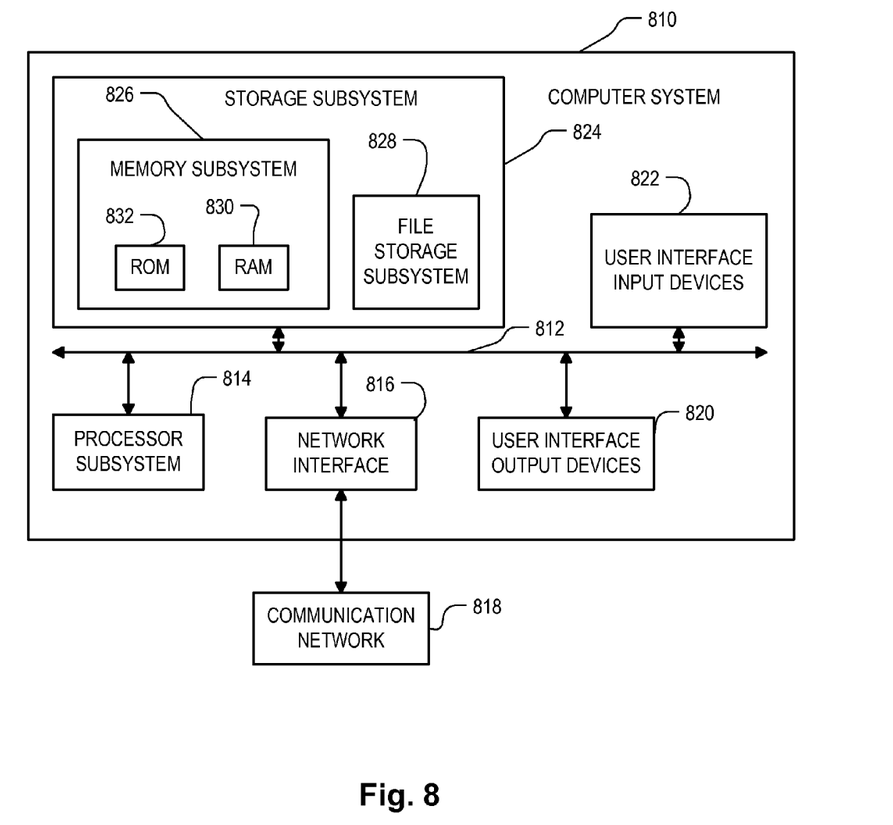
FIG. 8 is a block diagram of a computer that carries out computer-implemented parts of the technology.

FIG. 8 is a simplified block diagram of a computer system 810 that can be used to implement software incorporating aspects of the present invention. While the flow chart figures set forth herein describe series of steps, it will be appreciated that each step of the flow chart or algorithm can be implemented by causing a computer system such as 810 to operate in a specified manner. The individual function blocks may be housed in separate software modules in the computer system, or they may be combined into a single module, or a combination of both, and flow through the modules may be sequential or pipelined.

Computer system 810 typically includes a processor subsystem 814 which communicates with a number of peripheral devices via bus subsystem 812. Processor subsystem 814 may contain one or a number of processors. The peripheral devices may include a storage subsystem 824, comprising a memory subsystem 826 and a file storage subsystem 828, user interface input devices 822, user interface output devices 820, and a network interface subsystem 816. The input and output devices allow user interaction with computer system 810. Network interface subsystem 816 provides an interface to outside networks, including an interface to communication network 818, and is coupled via communication network 818 to corresponding interface devices in other computer systems. Communication network 818 may comprise many interconnected computer systems and communication links. These communication links may be wireline links, optical links, wireless links, or any other mechanisms for communication of information. While in one embodiment, communication network 818 is the Internet, in other embodiments, communication network 818 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells on a single integrated circuit chip with other components of the computer system.

User interface input devices 822 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 810 or onto computer network 818.

User interface output devices 820 may include a display subsystem, a printer, a fax machine, or non visual displays such as audio output devices. The display subsystem may include a cathode ray tube (CRT), a flat panel device such as a liquid crystal display (LCD), a projection device, or some other mechanism for creating a visible image. The display subsystem may also provide for non visual display such as via audio output devices. In general, use of the term "output device" is intended to include all possible types of devices and ways to output information from computer system 710 to the user or to another machine or computer system.

Storage subsystem 824 stores the basic programming and data constructs that provide the functionality of certain embodiments of the present invention. For example, the various modules implementing the functionality of certain embodiments of the invention may be stored in storage subsystem 824. These software modules are generally executed by processor subsystem 814.

Memory subsystem 826 typically includes a number of memories including a main random access memory (RAM) 830 for storage and instructions and data during program execution and a read only memory (ROM) 832 in which fixed instructions are stored. File storage subsystem 828 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystems 828. The host memory 826 contains, among other things, computer instructions such as program code which, when executed by the processor subsystem 814, cause the computer system to operate or perform functions as described herein. As used herein, processes and software that are said to run in or on "the host" or "the computer", execute on the processor subsystem 814 in response to computer instructions and data in the host memory subsystem 826 including any other local or remote storage for such instructions and data.

Bus subsystem 812 provides a mechanism for letting the various components and subsystems of computer system 810 communicate with each other as intended. Although bus subsystem 812 is shown schematically as a single bus, alternative embodiments of the bus subsystem may use multiple busses.

Computer system 810 itself can be of varying types including a personal computer, a portable computer, a workstation, a computer terminal, a network computer, a television, a mainframe, or any other data processing system or user device. Due to the ever changing nature of computers and networks, the description of computer system 810 depicted in FIG. 8 is intended only as a specific example for purposes of illustrating the preferred embodiments of the present invention. Many other configurations of computer system 810 are possible having more or less components than the computer system depicted in FIG. 8.

Aspects of the present invention may be practiced as a method or device adapted to practice the method. The invention may be an article of manufacture such as a media impressed with logic to carry out the steps of the method when executed by a computer.

As used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

It will be appreciated that many of the steps may be combined in flow charts presented herein, performed in parallel or performed in a different sequence without affecting the functions achieved. In some cases a re-arrangement of steps will achieve the same results only if certain other changes are made as well, and in other cases a re-arrangement of steps will achieve the same results only if certain conditions are satisfied. Such re-arrangement of steps will achieve the same results only if certain conditions are satisfied. Such re-arrangement possibilities will be apparent to the reader.

One aspect of the technology is a system, comprising a memory and a channel emulator.

The memory stores a record of captured radio signal data of a first plurality of cellular base stations in a fielded cellular network. A cellular network that is fielded is actually deployed, such that the captured radio signal data is from an actually deployed network.

The channel emulator is coupled to the memory. The channel emulator comprises one or more processors and accesses instructions executable by the processors including instructions that cause the channel emulator to:

read the record of captured radio signal data of the first plurality of cellular base stations in the fielded cellular network from the memory; and based on the record of the captured radio signal data of the first plurality of cellular base stations in the fielded cellular network from the memory, generate a simulation of a radio environment of the fielded cellular network. The simulation generates a number of live cellular base station signals fewer than the first plurality of cellular base stations in the fielded cellular network. The signals are live, and not, for example, simply simulated in the confines of a pure software simulation.

In one embodiment, the first plurality of cellular base stations are captured by a wireless receiver at a particular time of the record.

In one embodiment, the first plurality of cellular base stations are a total number of base stations captured by a wireless receiver throughout the record.

One embodiment further comprises a network emulator generating the number of live cellular base station signals.

One embodiment further comprises a second plurality of cellular base stations generating the number of live cellular base station signals.

In one embodiment, the instructions for the channel emulator cause the simulation to selectively omit particular cellular base stations in the first plurality of cellular base stations. For example, this can mean including a particular cellular base station in the simulation and dropping the particular cellular base station in the simulation responsive to a predetermined drop in total power of the particular cellular base station in the record. For example, this can mean omitting the particular base stations which are not in a strongest set of signals. For example, this can mean omitting the particular base stations which are not in a strongest set of signals, and the strongest set of signals changes with time.

In one embodiment, the instructions for the channel emulator cause the simulation to compensate for discontinuities between an end and a beginning of the record of radio signal data of the fielded cellular network to allow for looping of the simulation.

One embodiment further comprises a wireless receiver coupled to the channel emulator.

One embodiment further comprises a wireless receiver coupled to the channel emulator, wherein the wireless receiver is different from a recording device which captured the record of radio signal data of the fielded cellular network.

Another aspect of the technology is a system comprising a memory and a channel emulator.

The memory stores a record of captured radio signal data of a first plurality of cellular base stations in a fielded cellular network. A cellular network that is fielded is actually deployed, such that the captured radio signal data is from an actually deployed network.

The channel emulator is coupled to the memory. The channel emulator comprises one or more processors and accesses instructions executable by the processors including instructions that cause the channel emulator to:

read the record of captured radio signal data of the first plurality of cellular base stations in the fielded cellular network from the memory; and based on the record of the captured radio signal data of the first plurality of cellular base stations in the fielded cellular network from the memory, apply a terrain environment model for a simulation of a radio environment of the fielded cellular network. The simulation generates a number of live cellular base station signals. The signals are live, and not, for example, simply simulated in the confines of a pure software simulation.

In one embodiment, the first plurality of cellular base stations are captured by a wireless receiver at a particular time of the record.

In one embodiment, the first plurality of cellular base stations are a total number of base stations captured by a wireless receiver throughout the record.

One embodiment further comprises a network emulator generating the number of live cellular base station signals.

One embodiment further comprises a second plurality of cellular base stations generating the number of live cellular base station signals.

In one embodiment, the terrain environment model compensates for omissions in the record of radio signal data of the fielded cellular network.

In one embodiment, the terrain environment model compensates for omissions in the record of radio signal data of the fielded cellular network. In various embodiment the omissions include changes in multipath conditions between captured measurements, and the omissions include an amount of line of sight component in a wireless signal.

In one embodiment, the terrain environment model is determined by combining captured GPS data in the record with geodetic data.

In one embodiment, the terrain environment model is determined with captured velocity information of a recoding device which captured the record.

In one embodiment, the terrain environment model estimates a density of cells in the fielded cellular network with captured cell IDs and traveled distance information of the record.

In one embodiment, the instructions for the channel emulator cause the simulation to switch between multiple terrain environment models during the simulation.

In one embodiment, the instructions for the channel emulator cause the simulation to switch automatically between multiple terrain environment models during the simulation.

In one embodiment, the terrain environment model compensates for imperfections in a recording device which captured the record of radio signal data of the fielded cellular network.

In one embodiment, the instructions for the channel emulator cause the simulation to compensate for discontinuities between an end and a beginning of the record of radio signal data of the fielded cellular network to allow for looping of the simulation.

One embodiment further comprises a wireless receiver coupled to the channel emulator.

One embodiment further comprises a wireless receiver coupled to the channel emulator, wherein the wireless receiver is different from a recording device which captured the record of radio signal data of the fielded cellular network.

Another aspect of the technology is a method, comprising:
reading a record of captured radio signal data of a first plurality of cellular base stations in a fielded cellular network from the memory; and
based on the record of the captured radio signal data of the first plurality of cellular base stations in the fielded cellular network from the memory, generating a simulation of a radio environment of the fielded cellular network, the simulation generating a number of live cellular base station signals fewer than the first plurality of cellular base stations in the fielded cellular network.

Another aspect of the technology is a method, comprising:
reading a record of captured radio signal data of a first plurality of cellular base stations in a fielded cellular network from the memory; and
based on the record of the captured radio signal data of the first plurality of cellular base stations in the fielded cellular network from the memory, applying a terrain environment model for a simulation of a radio environment of the fielded cellular network, the simulation generating a number of live cellular base station signals.

Other aspects are directed to a computer readable medium storing executable code that performs various embodiments described herein, such as the mapping of cellular base station signals in simulation to captured cellular base stations, or the selection or application of a terrain environment model based on captured RF data.

Various embodiments of the various aspects are described herein.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in the art. While the present invention has been described by reference to preferred embodiments and examples detailed above, it is understood that these examples are intended in an illustrative rather than in a limiting sense. Computer-assisted processing may be used to implement the described embodiments. Accordingly, the present invention may be embodied in methods for performing the specified steps, systems including logic and resources to carry out the specified steps, media impressed with logic to carry out the specified steps, data streams impressed with logic to carry out the specified steps, or computer-accessible services that carry out the specified steps. It is contemplated that modifications and combinations will readily occur to those skilled in the art, which modifications and combinations will be within the spirit of the invention.

The invention claimed is:

1. A system, comprising:
a memory storing a record of captured radio signal data of a first plurality of cellular base stations in a fielded cellular network; and
a channel emulator coupled to the memory, the channel emulator comprising one or more processors and accessing instructions executable by the processors including instructions that cause the channel emulator to:
read the record of captured radio signal data of the first plurality of cellular base stations in the fielded cellular network from the memory; and
based on the record of the captured radio signal data of the first plurality of cellular base stations in the fielded cellular network from the memory, generate a simulation of a radio environment of the fielded cellular network, the simulation generating a number of live cellular base station signals fewer than the first plurality of cellular base stations in the fielded cellular network.

2. The system of claim 1, wherein the first plurality of cellular base stations are captured by a wireless receiver at a particular time of the record.

3. The system of claim 1, wherein the first plurality of cellular base stations are a total number of base stations captured by a wireless receiver throughout the record.

4. The system of claim 1, further comprising:
a network emulator generating the number of live cellular base station signals.

5. The system of claim 1, further comprising:
a second plurality of cellular base stations generating the number of live cellular base station signals.

6. The system of claim 1, wherein the instructions for the channel emulator cause the simulation to selectively omit particular cellular base stations in the first plurality of cellular base stations.

7. The system of claim 1, wherein the instructions for the channel emulator cause the simulation to selectively omit particular cellular base stations in the first plurality of cellular base stations, by including a particular cellular base station in the simulation and dropping the particular cellular base station in the simulation responsive to a predetermined drop in total power of the particular cellular base station in the record.

8. The system of claim 1, wherein the instructions for the channel emulator cause the simulation to selectively omit particular cellular base stations in the first plurality of cellular base stations, by omitting the particular base stations which are not in a strongest set of signals.

9. The system of claim 1, wherein the instructions for the channel emulator cause the simulation to selectively omit particular cellular base stations in the first plurality of cellular base stations, by omitting the particular base stations which are not in a strongest set of signals, and the strongest set of signals changes with time.

10. The system of claim 1, wherein the instructions for the channel emulator cause the simulation to compensate for discontinuities between an end and a beginning of the record of radio signal data of the fielded cellular network to allow for looping of the simulation.

11. The system of claim 1, further comprising:
a wireless receiver coupled to the channel emulator.

12. The system of claim 1, further comprising:
a wireless receiver coupled to the channel emulator, wherein the wireless receiver is different from a recording device which captured the record of radio signal data of the fielded cellular network.

13. A system, comprising:
a memory storing a record of captured radio signal data of a first plurality of cellular base stations in a fielded cellular network; and
a channel emulator coupled to the memory, the channel emulator comprising one or more processors and accessing instructions executable by the processors including instructions that cause the channel emulator to:

read the record of captured radio signal data of the first plurality of cellular base stations in the fielded cellular network from the memory; and based on the record of the captured radio signal data of the first plurality of cellular base stations in the fielded cellular network from the memory, apply a terrain environment model for a simulation of a radio environment of the fielded cellular network, the simulation generating a number of live cellular base station signals.

14. The system of claim 13, wherein the first plurality of cellular base stations are captured by a wireless receiver at a particular time of the record.

15. The system of claim 13, wherein the first plurality of cellular base stations are a total number of base stations captured by a wireless receiver throughout the record.

16. The system of claim 13, further comprising:
a network emulator generating the number of live cellular base station signals.

17. The system of claim 13, further comprising:
a second plurality of cellular base stations generating the number of live cellular base station signals.

18. The system of claim 13, wherein the terrain environment model compensates for omissions in the record of radio signal data of the fielded cellular network.

19. The system of claim 13, wherein the terrain environment model compensates for omissions in the record of radio signal data of the fielded cellular network, the omissions including changes in multipath conditions between captured measurements.

20. The system of claim 13, wherein the terrain environment model causes the simulation to compensate for omissions in the record of radio signal data of the fielded cellular network, the omissions including an amount of line of sight component in a wireless signal.

21. The system of claim 13, wherein the terrain environment model is determined by combining captured GPS data in the record with geodetic data.

22. The system of claim 13, wherein the terrain environment model is determined with captured velocity information of a recoding device which captured the record.

23. The system of claim 13, wherein the terrain environment model estimates a density of cells in the fielded cellular network with captured cell IDs and traveled distance information of the record.

24. The system of claim 13, wherein the instructions for the channel emulator cause the simulation to switch between multiple terrain environment models during the simulation.

25. The system of claim 13, wherein the instructions for the channel emulator cause the simulation to switch automatically between multiple terrain environment models during the simulation.

26. The system of claim 13, wherein the terrain environment model compensates for imperfections in a recording device which captured the record of radio signal data of the fielded cellular network.

27. The system of claim 13, wherein the instructions for the channel emulator cause the simulation to compensate for discontinuities between an end and a beginning of the record of radio signal data of the fielded cellular network to allow for looping of the simulation.

28. The system of claim 13, further comprising:
a wireless receiver coupled to the channel emulator.

29. The system of claim 13, further comprising:
a wireless receiver coupled to the channel emulator, wherein the wireless receiver is different from a recording device which captured the record of radio signal data of the fielded cellular network.

* * * * *